June 21, 1966     S. B. RADLOVE ET AL     3,257,232
METHOD OF PREPARING A PHENOLIC-DRYING OIL
COATING ON A METAL SUBSTRATE
Filed Dec. 28, 1961
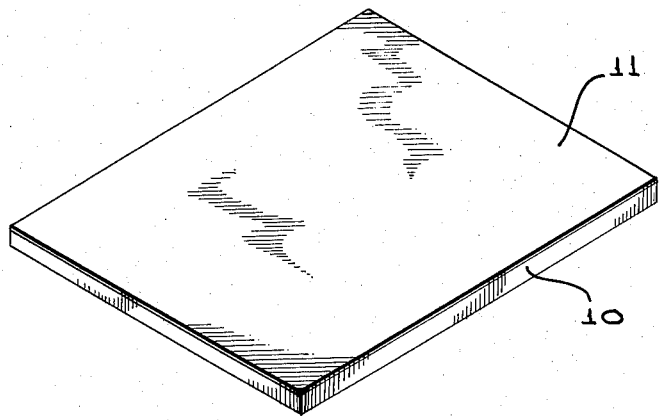
SOL B. RADLOVE, INVENTORS
ABRAHAM RAVVE &
CHESTER W. FITKO
BY *Mason, Porter, Diller & Stewart,*
ATTORNEYS

3,257,232
METHOD OF PREPARING A PHENOLIC-DRYING OIL COATING ON A METAL SUBSTRATE
Sol B. Radlove, Abraham Ravve, and Chester W. Fitko, Chicago, Ill., assignors to Continental Can Company, Inc., New York, N.Y., a corporation of New York
Filed Dec. 28, 1961, Ser. No. 162,723
4 Claims. (Cl. 117—132)

This invention relates to the production of coatings from raw drying oils by baking with phenolic resole resins.

It is well known to prepare oleoresinous coating compositions by heating phenolic resins, particularly those of the so-called oil-soluble type, with a drying oil until a condition of incipient gelling is attained. The mixture thickens, i.e., becomes more viscous during such cooking. The product can be diluted by volatile organic solvents, and applied to metal, e.g. tin plates, and baked at 375 to 425 degrees F. to provide a hard coating. With many resins, the solution does not wet the metal surface well, or provides a baked coating which peels or which reacts with and is softened by fats, e.g. the animal fats with meat, during processing treatment. Also, the film is often so brittle that it breaks when the metal is being fabricated, e.g. in forming can ends or body double-seams.

Infra-red studies indicate addition type polymerization occurs in the drying oil during cooking in the absence of oxygen, as well as Diels-Alder type condensation when elevated cooking temperatures are used. These are independent of the presence of oxygen. During air-drying the drying oil can absorb oxygen, and a cross-linking can occur through a free radical copolymerization of oxygen and the olefinic bonds, usually through a peroxidation procedure. When the oleoresinous films are baked, the infra-red absorption at the region of 2.8 to 3.0 microns, indicative of the presence of the hydroxyl or OH group, remains essentially unchanged: as does the absorption in 8 to 9 micron region indicative of the presence of

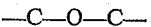

groups. These can be ascribed to recation at drying oil double-bonds with the nucleus of the phenol in the resole, by an alkylation reaction, whereby a chain carbon of the drying oil molecule displaces a hydrogen atom of the nucleus and replaces it so the nucleus then has the drying oil molecule appended thereto, with the usual ·OH and ·CH·OH groups unchanged and revealing the OH presence by infra-red absorption. Also, a type of etherification can occur, by which such a chain carbon atom displaces the hydrogen of the phenol group and thus attaches the drying oil molecule to the nucleus through an oxygen atom, with the hydrogen probably acting to satisfy the next-adjacent carbon chain atom upon the opening of the double-bond: and the ·C·O·C· ether group appears in the infra-red studies.

It has been found that a superior coating composition can be prepared from raw drying oils with conjugate double-bonds, by employment of phenolic resole resins so that the phenol nucleus reacts with the two carbon chain atoms of a double-bond, to form a chromane ring. This reaction can be depicted as firstly:

(1)

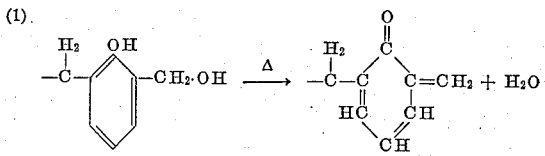

That is, a resole phenol group loses hydrogen from its phenolic hydroxyl, and hydroxyl from its ·CH₂·OH branch, as elements of water, and internal rearrangement to a quinone methide form occurs. In the presence of a drying oil, the further reaction can occur:

(2)

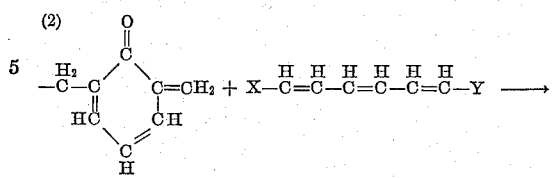

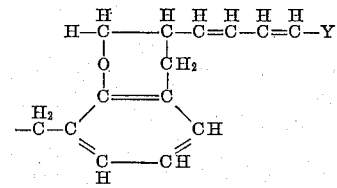

in which X and Y designate the terminal portions of a tung oil molecule with the three conjugated double-bonds. Illustratively the left-hand double-bond has opened and its carbon atoms become connected to the ketone oxygen of the quinone group and to the methide branch thereof, with valency satisfying relocation of the double-bonds of the ring so a benzene nucleus is re-formed. Therewith the chromane ring of five carbon and one oxygen atoms has two of the carbons from the former quinone ring and two from adjacent carbons of the drying oil chain, with two parallel covalent links between the resole and the oil. Upon infra-red tests of the baked film, the —OH transmission in the region at 2.8 to 3.0 microns has largely disappeared, the transmission at the ·C·O·C· region at 8 to 9 microns is reduced at 8.6 to 8.75 microns and increased at 8.2 microns. The usual ·C=C· peaks at 10.2, 10.4 and 11.45 microns have disappeared. Therein, the present baked film is distinct from that produced by a cooked oleoresin.

Illustrative examples of practice under this invention are:

*Example 1*

A phenolic resole was prepared from:

| Compound | Mol. Wt. | Mol. Ratio | Quantity, gms. |
|---|---|---|---|
| Phenol | 94 | 1 | 188 |
| Nonylphenol | 220 | 1.8 | 792 |
| Formaldehyde (as paraformaldehyde) | 30 | 6.6 | 436 |
| Triethylamine | 101.2 | 0.56 | 112 |
| Water | | | 100 |

The phenols, paraformaldehyde and water were charged into a three-necked, five-liter flask fitted with a stirrer and a thermometer. The triethylamine catalyst was added with stirring, and the exothermal heat was allowed to dissipate, by control of the rate of catalyst addition, or by cooling, without a rise in temperature beyond about 60 degrees C. The flask was then heated to advance the resin condensation by stages, with one hour at 60–70 degrees C. and two hours at 95 degrees C. Therewith the resin had thickened notably, and 100 milliliters of amyl alcohol was added, and the heating at 95 degrees C. was continued, with subsequent additions of amyl alcohol to compensate further thickening until 400 milliliters in all had been added. This continued heating caused the resin to attain an incipient gel point, noted by a Strokes cure at 150° C. of 12–20 seconds. 600 milliliters of amyl alcohol were added immediately, and the heating and stirring continued until a completely homogeneous mixture had been attained. The resin solution was washed with water three times at 90–95 degrees C., with stirring: after each washing, the mixture was allowed to settle, and the lower aqueous layer was siphoned off. A Barrett trap was placed on the flask, and the remaining liquid was azeotropically distilled under vacuum for water elimination. When all traces of water were gone, the temperature was raised, and 400 to 500 milliliters of amyl alcohol was distilled off under vacuum. 300 milliliters of pentoxone and 300–400 milliliters of diacetone alcohol were added, and the mixture stirred until homogeneous. The uniform resin solution contained about 49 percent solids.

Methyl isobutyl carbinol can be employed in place of amyl alcohol.

A coating composition was prepared from this phenolic resole resin solution, by stirring together:

718 grams of phenolic resole (as 1460 grams of above solution, 49.2% solids)
588 grams of raw tung oil
588 grams of high-flash naphtha
8 drops of standard 6% iron drier solution This mixture had a weight ratio of 55 percent of phenolic resole and 45 percent of tung oil: with 49.5% solids. The viscosity was A–B (Gardner scale). An aluminum pigmented enamel was prepared from such vehicle mixture by adding and blending aluminum pigment in quantity of 10 percent of the resin solids weight. An enamel for acid food products was made by adding zinc oxide in the ratio of 15 percent by weight of the resin solids.

The coating compositions were applied to electrolytic tin plates and baked. The viscosity permitted application in a thin film by a standard roller coater; and good surface wetting and good flow properties were exhibited. On baking at 410 degrees F. for 8 minutes, or at 600 degrees F. for 18 seconds, the film was hard, tough, and of satisfactory flexibility to permit fabrication of can ends and the double-seaming of can body walls. Processing in an atmosphere of oxidizing acid vapor and steam, for 90 minutes at 240 degrees F., showed no peeling or other evidence of destructive deterioration of the coating film.

The same phenolic and oil components can be employed with 47.5 percent by weight of the phenolic resole, and 52.5 percent by weight of tung oil, for the solids component of the solution, and adding 16 drops of the standard 6 percent iron drier solution. Upon applying, with the added pigment, and baking as above, the coating film was hard and tough, and exhibited a flexibility apparently greater than that of the 55:45 mixture of resole:drying oil with the same chemical resistance.

*Example II*

A phenolic amine resole resin was prepared from:

| Compound | Mol. wt. | Mol. Ratio | Quantity, gms. |
|---|---|---|---|
| Phenol | 94 | 3 | 282 |
| Nonylphenol | 220 | 2 | 440 |
| Formaldehyde | 30 | 10.5 | |
| (as 37% aq. soln.) | | | 852 |
| Ammonia | 17 | 10.5 | |
| (as 28% aq. soln.) | | | 638 |

The phenols and formaldehyde were placed in a three-necked, five-liter flask fitted with a stirrer, a thermometer, and a condenser. The ammonia solution was added slowly, while noting the exothermal temperature rise, so the temperature was kept below 70 degrees C. Heating was used to keep the temperature at 65 to 70 degrees C. for an hour, and the mixture was then heated at 80 to 85 degrees C. for two hours. A vacuum of 25 inches (mercury) was then applied through the condenser, and dehydration effected while the pot temperature was held at about 60 degrees C., with the resin molten and fluid. When condensation of water essentially ceased, 500 milliliters of amyl alcohol were added to dissolve the resin: and azeotropic distillation under vacuum conducted to remove residual water. The dissolved resole or B stage resin was then advanced by heating the solution at 80–90 degrees C. for about ten hours, until a Strokes cure test at 150 degrees C. showed a value of about 100 seconds. The solution was water-washed three times as in Example I, removing the successive settled water layers: and dried under vacuum. A mixture of amyl alcohol and butyl Cellosolve was added, to bring the solids content to 36.1 percent.

A coating composition was prepared from 65 percent by weight of the phenolic resin, 35 percent by weight of raw tung oil, and a trace of iron drier. Tin plate coated with this enamel was baked for ten minutes at 410 degrees F. The cured film had a gold color, was tough and hard, fabricated well into can ends, and was resistant to processing at 240 degrees F. in steam and in contact with meats and fats. A like condition was attained by baking for 10 seconds at 700 degrees F. in a high temperature oven. Chloroform treatment of the baked films showed low extractables, indicating a high degree of cure.

In general, the condensation of the phenol and alkylphenol with formaldehyde, with a basic catalyst, should be conducted to a strokes gel test of 8 to 100 seconds at 150 degrees C.

The baking upon the metal plate can be satisfactorily conducted on an inverse time: temperature relation; for example 10 minutes at 400 degrees F., 8 minutes at 410 degrees F., 6 minutes at 420 degrees F., with 10 seconds at 700 degrees F. It has been found that ranges of baking time can be employed: for example times of 8 to 10 minutes can be employed at 410 degrees F., and like brackets for other temperatures.

The drawing shows the coated article as comprising a base or substrate 10 of metal such as tin plate; and the baked film 11 thereon of the instant composition. Such an article exhibits the hardness, toughness and flexibility of the coating film, and its material and adhesion withstands the processing test.

The procedure employs drying oils having multiple double-bonds, by establishment of the chromane ring at one double-bond while leaving the other double-bonds ready for effecting cross-linking between molecules during the baking or curing operation. The tung oil of the examples is illustrative of the drying oils having such multiple bonds including conjugate double-bonds. Other examples are oiticica and isano oils, which can be employed in like fashion. The oils are employed in the raw state, that is, the active conjugate portions of the fatty acid radical are present.

By comparison, when oils containing isolated double-bonds such as linseed oil, bodied fish oil and bodied dehydrated castor oil are employed, by blending or cold-cutting with the phenolic resole and the iron drier in like proportions, and applying the mixture to tin plate and baking for 8 minutes at 420 degrees F., the film was softer and did not resist the process adhesion test. With such oils, the chromane rings form at a double-bond, but the non-conjugated remaining bonds are isolated and inter-molecular reaction is far slower at such bonds as compared to the rapid interaction at the conjugate double-bonds even in the absence of oxygen.

The amyl alcohol, methyl isobutyl carbinol, butyl cellosolve, pentoxone and diacetone alcohol are illustrative of known volatile organic solvents for resole phenolic resins: and the high-flash naphtha is illustrative of a cheap mineral spirits diluent for such solvents.

The iron drier is illustrative of metallic driers: cobalt and manganese driers may be used.

The ratio of quantities by weight of phenolic resole resin and raw drying oil can be varied between 45:55 and 65:35.

Phenol: formaldehyde B stage resins can be employed, inclusive of the basic catalyzed phenolic resole of Example I, and the phenol-amine resin of Example II. The ratio of phenol to formaldehyde does not appear critical; e.g. one mole of phenol to 1 to 3 moles of formaldehyde can be employed in lieu of the 1:2.4 ratio of the examples.

The mixture of simple phenol or mono-hydroxybenzene with monoalkyl phenol confers desirable flexibility upon the product within the stated ranges. The alkyl group should comprise 8 to 18 carbon atoms in linear or branched form; and the alkyl-phenol should be essentially free of di-alkyl components, e.g. less than about 5 percent in the commercial forms. The molecular ratio of alkyl-phenol to simple phenol can be from ½:1 to 2:1.

The illustrative examples are not restrictive, and the invention can be practiced in many ways within the scope of the appended claims.

What is claimed is:

1. A method of preparing a hard-flexible adherent coating on a metal substrate which comprises applying to said substrate an effective amount of an unreacted phenolic resin-drying oil composition and subsequently baking said composition onto the metal substrate at a temperature ranging from about 400° F. to 700° F. for a period of at least 10 seconds; said unreacted phenolic resin-drying oil composition consisting essentially of a volatile-organic solution comprising approximately 45 to 65% by weight of a phenol-aldehyde resin, 35 to 55% by weight of a raw drying oil selected from the group consisting of tung oil, oiticica oil, and isano oil, and an effective amount of a metallic drier; said phenol-aldehyde resin prepared by condensing a mixture consisting essentially of about 0.5 to 2.0 parts-by-weight of phenol for each part-by-weight of a monoalkyl phenol wherein the alkyl group has 8 to 18 carbon atoms, and about 1 to 3 parts-by-weight of an aldehyde for each part-by-weight of a combination of phenols in the phesence of an alkaline polymerization catalyst to obtain a phenolic resin having a Strokes gel of about 8 to 100 seconds at 150° C.

2. The method of claim 1 further characterized in that the phenolic resin-drying oil composition is baked onto the metal substrate at a temperature ranging from about 410° F. to 600° F. for a period ranging from about 18 seconds to 8 minutes.

3. The method of claim 1 further characterized in that the phenolic resin-drying oil composition consists essentially of a volatile-organic solution comprising approximately 45 to 65% by weight of a phenol-formaldehyde resin and 35 to 55% by weight of raw tung oil.

4. The method of claim 3 further characterized in that the phenol-formaldehyde resin is prepared by condensing a combination of nonyl phenol and phenol in the presence of an ammonia catalyst.

References Cited by the Examiner

UNITED STATES PATENTS

| | | | |
|---|---|---|---|
| 1,800,296 | 4/1931 | Honel | 260—19 |
| 3,048,508 | 8/1962 | Boiney et al. | 260—19 |
| 3,053,807 | 9/1962 | Lederman et al. | 260—19 |
| 3,134,682 | 5/1964 | Vogel et al. | 260—19 |

DONALD E. CZAJA, *Primary Examiner.*

MILTON STERMAN, LEON J. BERCOVITZ,
*Examiners.*